(12) United States Patent
Lourdu Raja et al.

(10) Patent No.: US 11,706,004 B2
(45) Date of Patent: Jul. 18, 2023

(54) METHOD FOR ASSIGNING IDENTIFIERS TO FRONTHAUL TRAFFIC FLOWS IN O-RAN COMPLIANT RADIO ACCESS NETWORK

(71) Applicant: Mavenir Systems, Inc., Richardson, TX (US)

(72) Inventors: Charles Santhosam Lourdu Raja, Bangalore (IN); Ankit Kumar Agarwal, Bengaluru (IN); Somashekar Mudaraddi, Bengaluru (IN)

(73) Assignee: Mavenir Systems, Inc., Richardson, TX (US)

( * ) Notice: Subject to any disclaimer, the term of this patent is extended or adjusted under 35 U.S.C. 154(b) by 85 days.

(21) Appl. No.: 17/350,147

(22) Filed: Jun. 17, 2021

(65) Prior Publication Data

US 2022/0014326 A1 Jan. 13, 2022

(30) Foreign Application Priority Data

Jul. 10, 2020 (IN) .............................. 202021029440

(51) Int. Cl.
*H04L 5/00* (2006.01)
(52) U.S. Cl.
CPC .......... *H04L 5/0048* (2013.01); *H04L 5/0046* (2013.01); *H04L 5/0076* (2013.01); *H04L 5/0094* (2013.01)
(58) Field of Classification Search
CPC ... H04L 5/0048; H04L 5/0046; H04L 5/0076; H04L 5/0094; H04W 76/11
See application file for complete search history.

(56) References Cited

U.S. PATENT DOCUMENTS

2021/0007039 A1* 1/2021 Salahuddeen ......... H04L 5/0044
2021/0120531 A1* 4/2021 Jeon ...................... H04B 7/088

OTHER PUBLICATIONS

ORAN-WG4.CUS.0-v03 "Control, User and Synchronization Plane Specification", O-RAN Alliance, Working Group 4, 2020.

(Continued)

*Primary Examiner* — Justin T Van Roie
(74) *Attorney, Agent, or Firm* — Ruggiero, McAllister & McMahon LLC

(57) ABSTRACT

A method of enabling enhanced Management Plane functions on the fronthaul interface between Open Radio Access Network Radio Unit (O-RU) and O-RAN Distributed Unit (O-DU) includes: identifying four subfields within 16-bit Extended Antenna Carrier Id (Eaxc-ID) field using a first set of four specified bitmasks including DU_Port_ID bitmask, BandSector_ID bitmask, CC_ID bitmask, and RU_Port_ID bitmask; and providing a second set of specified bitmasks including at least one of band-bitmask, sector-bitmask, channel-type-bitmask, and layer-antenna-port-bitmask, wherein: i) band bitmask defines which bits within the BandSector_ID bitmask subfield are used to indicate band; ii) sector bitmask defines which bits within the BandSector_ID bitmask subfield are used to indicate sector-id; iii) channel-type bitmask defines which bits within the RU_Port_ID bitmask subfield are used to indicate channel type; and iv) layer-antenna-port bitmask defines which bits within the RU_Port_ID bitmask subfield are used to indicate one of antenna port number or data layer number.

11 Claims, 7 Drawing Sheets

(56) References Cited

OTHER PUBLICATIONS

ORAN-WG4.MP.0-v03.00: "O-RAN Fronthaul Working Group Management Plane Specification" Release 02.00, Apr. 17, 2020.
ORAN-WG4.CUS.0-v02 "Control, User and Synchronization Plane Specification", O-RAN Alliance, Working Group 4, Aug. 2, 2019, pp. 1-218.
ORAN-WG4.MP.0-v02.00: "O-RAN Alliance Working Group 4 Management Plane Specification" Release 2.00, Jul. 3, 2019, pp. 1-149.
ORAN-WG1.OAM Architecture—v01.00 "O-RAN Operations and Maintenance Architecture", O-RAN Alliance, Working Group 1,Jul. 1, 2019, pp. 1-35.
O-RAN Alliance "O-RAN: Towards an Open and Smart RAN, White Paper", O-RAN Alliance, Oct. 1, 2018, pp. 1-19.
Umesh et al. "Overview of O-RAN Fronthaul Specifications" NTT DOCOMO Technical Journal, vol. 21, No. 1, Jul. 2019 pp. 46-59.
Extended European Search Report for corresponding European application No. 21183663, 9 pages dated Nov. 29, 2021.

* cited by examiner

```
+--rw low-level-tx-endpoints* [name]
|  +--rw name      -> /user-plane-configuration/static-low-level-tx-endpoint
|  +--rw compression!
|  |  +--rw iq-bitwidth?                        uint8
|  |  +--rw compression-type                    enumeration
|  |  x--rw bitwidth?                           uint8
|  |  +--rw (compression-format)?
|  |     +--:(no-compresison)
|  |     +--:(block-floating-point)
|  |     |  +--rw exponent?                     uint8
|  |     +--:(block-scaling)
|  |     |  +--rw block-scalar?                 uint8
|  |     +--:(u-law)
|  |     |  +--rw comp-bit-width?               uint8
|  |     |  +--rw comp-shift?                   uint8
|  |     +--:(beam-space-compression)
|  |     |  +--rw active-beam-space-coeficient-mask*   uint8
|  |     |  +--rw block-scaler?                 uint8
|  |     +--:(modulation-compression)
|  |        +--rw csf?                          uint8
|  |        +--rw mod-comp-scaler?              uint16
|  +--rw frame-structure?                       uint8
|  +--rw cp-type?                               enumeration
|  +--rw cp-length                              uint16
|  +--rw cp-length-other                        uint16
|  +--rw offset-to-absolute-frequency-center    int32
|  +--rw number-of-prb-per-scs* [scs]
|  |  +--rw scs            mcap:scs-config-type
|  |  +--rw number-of-prb  uint16
|  +--rw e-axcid
|     +--rw o-du-port-bitmask      uint16
|     +--rw band-sector-bitmask    uint16
|     +--rw ccid-bitmask           uint16
|     +--rw ru-port-bitmask        uint16
|     +--rw eaxc-id                uint16
```

Fig. 1

```
+--rw low-level-rx-endpoints* [name]
|  +--rw name    -> /user-plane-configuration/static-low-level-rx-endpoints/
|  +--rw compression
|  |  +--rw iq-bitwidth?                          uint8
|  |  +--rw compression-type                      enumeration
|  |  x--rw bitwidth?                             uint8
|  |  +--rw (compression-format)?
|  |     +--:(no-compresison)
|  |     +--:(block-floating-point)
|  |     |  +--rw exponent?                       uint8
|  |     +--:(block-scaling)
|  |     |  +--rw block-scalar?                   uint8
|  |     +--:(u-law)
|  |     |  +--rw comp-bit-width?                 uint8
|  |     |  +--rw comp-shift?                     uint8
|  |     +--:(beam-space-compression)
|  |     |  +--rw active-beam-space-coeficient-mask*  uint8
|  |     |  +--rw block-scaler?                   uint8
|  |     +--:(modulation-compression)
|  |        +--rw csf?                            uint8
|  |        +--rw mod-comp-scaler?                uint16
|  +--rw frame-structure?                         uint8
|  +--rw cp-type?                                 enumeration
|  +--rw cp-length                                uint16
|  +--rw cp-length-other                          uint16
|  +--rw offset-to-absolute-frequency-center      int32
|  +--rw number-of-prb-per-scs* [scs]
|  |  +--rw scs                  mcap:scs-config-type
|  |  +--rw number-of-prb        uint16
|  +--rw ul-fft-sampling-offsets* [scs]
|  |  +--rw scs                       mcap:scs-config-type
|  |  +--rw ul-fft-sampling-offset?   uint16
|  +--rw e-axcid
|  |  +--rw o-du-port-bitmask     uint16
|  |  +--rw band-sector-bitmask   uint16
|  |  +--rw ccid-bitmask          uint16
|  |  +--rw ru-port-bitmask       uint16
|  |  +--rw eaxc-id               uint16
```

Fig. 2

UL Channel Type Enumerations (O-RU to O-DU)
- Enum TYPE_PUCCH_PUSCH = 0
- Enum TYPE_PRACH = 1
- Enum TYPE_SRS = 2

DL Channel Type Enumerations (O-DU to O-RU)
- Enum TYPE_NON_SSB = 0
- Enum TYPE_SSB = 1

Layer Type Enumerations (O-DU to O-RU)
- Enum TYPE_LAYER_1 = 0
- Enum TYPE_LAYER_2 = 1

Antenna Port Type Enumerations (O-DU to O-RU)
- Enum TYPE_ANTENNA_PORT_0 = 0
- Enum TYPE_ANTENNA_PORT_1 = 1

Fig. 4

| | | | | | | | | | | | | | | | | |
|---|---|---|---|---|---|---|---|---|---|---|---|---|---|---|---|---|
| du-port-id bitmask == 2 bits == 1100 0000 0000 0000 == 49152 | 1 | 1 | 0 | 0 | 0 | 0 | 0 | 0 | 0 | 0 | 0 | 0 | 0 | 0 | 0 | 0 |
| band-sector-id bitmask == 6 bits == 0011 1111 0000 0000 == 16128 | 0 | 0 | 1 | 1 | 1 | 1 | 1 | 1 | 0 | 0 | 0 | 0 | 0 | 0 | 0 | 0 |
| cc-id bitmask == 4 bits == 0000 0000 1111 0000 == 240 | 0 | 0 | 0 | 0 | 0 | 0 | 0 | 0 | 1 | 1 | 1 | 1 | 0 | 0 | 0 | 0 |
| ru-port bitmask == 4 bits == 0000 0000 0000 1111 == 15 | 0 | 0 | 0 | 0 | 0 | 0 | 0 | 0 | 0 | 0 | 0 | 0 | 1 | 1 | 1 | 1 |
| band bitmask == 2 bits == 0011 0000 0000 0000 == 12288 | 0 | 0 | 1 | 1 | 0 | 0 | 0 | 0 | 0 | 0 | 0 | 0 | 0 | 0 | 0 | 0 |
| sector bitmask == 2 bits == 0000 1111 0000 0000 == 3840 | 0 | 0 | 0 | 0 | 1 | 1 | 1 | 1 | 0 | 0 | 0 | 0 | 0 | 0 | 0 | 0 |
| channel-type bitmask == 1 bit == 0000 0000 0000 1000 == 8 | 0 | 0 | 0 | 0 | 0 | 0 | 0 | 0 | 0 | 0 | 0 | 0 | 1 | 0 | 0 | 0 |
| Layer-antenna-port bitmask == 2 bits == 0000 0000 0000 0011 == 3 | 0 | 0 | 0 | 0 | 0 | 0 | 0 | 0 | 0 | 0 | 0 | 0 | 0 | 0 | 1 | 1 |

Fig. 5

|  | du-port-id | band-sector | | cc-id | | | | ru-port-id | | |
|  |  | band | sector |  |  |  |  | Ch. Typ |  | Ant. Port |
| --- | --- | --- | --- | --- | --- | --- | --- | --- | --- | --- |
| Ex 1: | eaxc-id = 0 | | | | | | | | | |
|  | 0 | 0 | 0 0 0 | 0 0 0 0 | | | | 0 | 0 0 | 0 |
|  | - du-port-id = 0 | | | | | | | | | |
|  | - band-sector = 0 | | | | | | | | | |
|  |   - band = 0 (= first band) | | | | | | | | | |
|  |   - sector = 0 (= first sector) | | | | | | | | | |
|  | - cc-id = 0 (= first carrier) | | | | | | | | | |
|  | - ru-port-id = 0 | | | | | | | | | |
|  |   - channel-type = 0 (= non-PRACH endpoint on Rx/ non-SSB endpoint on Tx) | | | | | | | | | |
|  |   - layer-antenna-port = 0 (= first port) | | | | | | | | | |
| Ex 2: | eaxc-id = 4122 | | | | | | | | | |
|  | 0 | 0 1 | 0 0 0 | 0 0 0 1 | | | | 1 | 0 1 | 0 |
|  | - du-port-id = 0 | | | | | | | | | |
|  | - band-sector = 16 | | | | | | | | | |
|  |   - band = 1 (= second band) | | | | | | | | | |
|  |   - sector = 0 (= first sector) | | | | | | | | | |
|  | - cc-id = 1 (= second carrier) | | | | | | | | | |
|  | - ru-port-id = 10 | | | | | | | | | |
|  |   - channel-type = 1 (= PRACH endpoint on Rx/ SSB endpoint on Tx) | | | | | | | | | |
|  |   - layer-antenna-port = 2 (= third port) | | | | | | | | | |

Fig. 6

METHOD FOR ASSIGNING IDENTIFIERS TO FRONTHAUL TRAFFIC FLOWS IN O-RAN COMPLIANT RADIO ACCESS NETWORK

BACKGROUND OF THE DISCLOSURE

1. Field of the Disclosure

The present disclosure relates to systems and methods for Radio Access Networks (RANs), and relates more particularly to Open RANs (O-RANs) for $4^{th}$-Generation (4G) and $5^{th}$-Generation (5G) based mobile networks.

2. Description of the Related Art

Conventional Radio Access Network (RAN) architecture has a digital baseband unit (also called a Distributed Unit (DU)) and a Radio Unit (RU), both installed at the cell site. Conventional RANs implement the protocol stack (e.g., Physical Layer (PHY), Media Access Control (MAC), Radio Link Control (RLC), Packet Data Convergence Control (PDCP) layers) at the base station (also referred to as the evolved node B (eNodeB or eNB) for 4G LTE or next generation node B (gNodeB or gNB) for 5G NR). In addition, conventional RANs use application specific hardware, e.g., as dictated by the vendor requirements, for the different network functions of the RAN, which make the conventional RANs difficult and costly to maintain and upgrade.

The Open RAN (O-RAN), on the other hand, defines vendor-neutral disaggregation of RAN, both at the hardware level and the software level. O-RAN defines open interfaces between components using hardware- and software-defined functions. Standardized interfaces between network functions allow an operator to choose multiple vendors to setup their network, thus giving the operator an opportunity for cost negotiations and cost reductions.

Cloud-based Radio Access Networks (CRANs) are networks where a significant portion of the RAN layer processing is performed at a baseband unit (BBU), located in the cloud on commercial off the shelf servers, while the radio frequency (RF) and real-time critical functions can be processed in the remote radio unit (RRU), also referred to as the radio unit (RU). The BBU can be split into two parts: centralized unit (CU) and distributed unit (DU). CUs are usually located in the cloud on commercial off the shelf servers, while DUs can be distributed. The BBU may also be virtualized, in which case it is also known as vBBU. Radio Frequency (RF) interface and real-time critical functions can be processed in the remote radio unit (RRU). For the RRU and DU to communicate, an interface called the fronthaul is provided.

O-RAN specifications define multiple planes between the O-DU and O-RU where management messages as well as control and user data flow. The Management Plane (M-Plane) is used by the O-DU to retrieve O-RU's capabilities and to send relevant configuration related to control plane (C-Plane) and data plane (U-Plane) to the O-RU. The C-Plane is used for real-time control messages between O-DU and O-RU, which control messages are used to transmit data-associated control information required for processing of user data (e.g., scheduling and beam-forming commands). Control messages are sent separately for downlink (DL)-related commands and uplink (UL)-related commands. The U-Plane refers to in-phase/quadrature (IQ) sample data transferred between O-DU and O-RU.

As part of the C-Plane and U-Plane configurations, the O-DU and O-RU need to define a set of endpoints that refer to the various data flows that would be used on the C-Plane and the U-Plane. An Extended Antenna Carrier Id (Eaxc-ID, or alternatively eaxc-id) value assigned to each of the O-RU's endpoint is used to identify the endpoint within O-RU, and it must be unique among all endpoints of O-RU in the same direction (Tx or Rx). O-RAN specifications define a 16-bit Eaxc-ID field for this purpose, which can be divided into four subfields, i.e., DU_Port_ID, BandSector_ID, Component Carrier id (CC_ID) and RU_Port_ID. Each subfield is explained below.

DU_Port_ID is used to differentiate processing units at O-DU (e.g., different baseband cards). The O-DU will assign these bits, and the O-RU will attach the same value to the UL U-Plane messages carrying the same sectionId data.

BandSector_ID represents an aggregated cell identifier (distinguishes bands and sectors supported by the O-RU).

CC_ID distinguishes Component Carriers supported by the O-RU.

RU_Port_ID designates logical flows such as data layers or spatial streams, and logical flows such as separate numerologies (e.g., Physical Random-Access Channel (PRACH)) or signalling channels requiring special antenna assignments such as SRS. The assignment of RU_Port_ID as part of the Eaxc is done by the O_DU via the M-plane.

The bit-width of these four subfields is flexible and the O-RAN specifications allow the O-DU and O-RU vendors to define the size of each of these subfields. Note that such flexibility is deemed necessary to support different RU capabilities such as multiple carriers, number of antenna ports, support of massive multiple input, multiple output (MIMO) feature, etc.

In order for the O-DU to be able to inform the O-RU about the actual size and position of these four subfields to be used while interpreting the Eaxc_ID, the O-RAN specifications provide four pre-defined bitmasks, as follows: DU_Port_ID bitmask; BandSector_ID bitmask; CC_ID bitmask; RU_Port_ID bitmask. The bit-width of each of the above fields is variable and set via M-Plane messaging. These four bitmasks may be set to desired values so that both the sender and the receiver may retrieve the individual subfield values from the 16-bit Eaxc-ID, received with control and data plane packets, based on these bitmasks.

However, in addition to the above-mentioned interpretation of the four subfields, there is a need to convey additional information between the O-DU and O-RU, e.g., to indicate Band and Sector information (within the BandSector_ID field), as well as Channel Type (e.g., Synchronization Signal Block (SSB) vs. non-SSB flows on transmission (Tx), or Physical Random Access Channel (PRACH) vs. non-PRACH flows on reception (Rx)). In addition, for each endpoint configured for a respective data flow, there is a need to indicate which antenna port number (or layer, for Category-B (CAT-B)) is referenced by the flow. The Eaxc-ID needs to be unique to identify these different O-RU endpoints and flows.

Currently there is no mechanism defined in O-RAN specifications by which 0-DU can inform O-RU about which bit(s) within 16-bit Eaxc-ID are used to represent the Band, Sector, Channel Type (SSB/PRACH) and Antenna ports. This lack of mechanism for sharing information leads to interoperability issues between O-DUs and O-RUs, which requires the O-DU and O-RU vendors to exchange information offline regarding the usage of the Eaxc-ID bitfields, which is problematic.

Existing O-RAN specifications allow a mechanism to only identify the four subfields within the 16-bit Eaxc-ID using the specified bitmasks. In the absence of any more bitmasks that may identify individual bits within these subfields, all configuration related to usage of individual bits for indicating Band, Sector, Channel Type or Antenna Port (data layer, in the case of Category-B (CAT-B)) information is currently decided offline by the O-DU and O-RU vendors and used in the software accordingly, while handling the control and data plane packets. Because there is currently no way for the O-DU to inform the O-RU about usage of individual bits during the M-plane configuration, the O-DU and O-RU software become more rigid in terms of interpretation of these individual bits at runtime. Any change in the interpretation of the individual bits would require O-DU and O-RU software to be changed and rebuilt, i.e., a given software version would only be able to support one type of interpretation of these bits for Band, Sector, Channel Type or Antenna Port/data layer information. Therefore, there is need for a mechanism to enable flexible communication of the additional information regarding Band, Sector, Channel Type and Antenna Port/data layer.

SUMMARY OF THE DISCLOSURE

The present disclosure relates to the RAN implementation for 4G- and 5G-based networks, e.g., mobile networks that follow the O-RAN 2.0 and later specifications (see, e.g., ORAN-WG4.MP.0-v03.00.00—O-RAN Alliance Working Group 4—"Management Plane Specification"; O-RAN.WG4.CUS.0-v03.00—O-RAN Fronthaul Working Group—"Control, User and Synchronization Plane Specification"). The present disclosure is applicable to both the cloud-based Radio Access Network function (CNF) and the Physical Network Function (PNF). In all cases, the O-RAN specifications define Management Plane (M-Plane) protocols which are used on the fronthaul interface between the O-RAN Radio Unit (O-RU) and O-RAN Distributed Unit (O-DU) (and also with Network Management System (NMS) for exchanging control and data-flow related information prior to any call setup). This flow information is later used for identifying the various flows and endpoints at the physical layers on O-DU and O-RU, when a call is in progress. The present disclosure provides an enhancement to the existing mechanism specified in O-RAN specifications for sharing the flow information.

According to an example embodiment of the present disclosure, new bitmasks are provided to be used along with the existing four bitmasks to identify individual bit or group of bits that would convey the additional information regarding Band, Sector, Channel Type and Antenna Port/data layer.

According to an example embodiment of the present disclosure, the new bitmasks' width is configured to be flexible so that along with the existing four bitmasks, the size of the new bitmasks can be adjusted to be accommodated within the 16-bit Eaxc-ID attribute.

According to an example embodiment of the present disclosure, the new bitmasks will overlap the existing four bitmasks instead of taking bits of their own. This provides at least two advantages: i) there will be no need to increase the width of the 16-bit Eaxc-ID field; and ii) there will not be any backward compatibility issue across network functions (O-DU and O-RU) which are compliant with different versions of the O-RAN specifications.

The present disclosure is intended to encompass other wireless systems that are O-RAN compliant.

BRIEF DESCRIPTION OF THE FIGURES

FIG. 1 illustrates Eaxc-ID in a low-level Tx endpoint according to the present disclosure.

FIG. 2 illustrates Eaxc-ID in a low-level Rx endpoint according to the present disclosure.

FIG. 4 illustrates definitions of a set of enumerated values to be used with the proposed new channel-type bitmask.

FIG. 5 illustrate an example set of values of the various bitmasks.

FIG. 6 illustrates example interpretations of various eaxc-id values.

DETAILED DESCRIPTION

The existing O-RAN specifications define different YANG files and YANG modules that describe the various data modules which are used to specify the system configuration to be used by the various network functions/modules such as O-DU and O-RU. YANG is a data modelling language which is used to describe how data is supposed to look. A YANG module defines a hierarchy of nodes that can be used for Network Configuration Protocol (NETCONF)-based operations. One of the Yang modules is o-ran-uplane-conf.yang which captures the information regarding the definition of endpoints to be used at the O-DU and O-RU. The o-ran-uplane-conf.yang module contains transmit (Tx) and receive (Rx) endpoints that define a list of endpoints to be configured and used on the DL and UL. Each endpoint defines its own Eaxc-ID bitmask and Eaxc-ID value, as shown in FIGS. 1 and 2. FIG. 1 illustrates Eaxc-ID in a low-level Tx endpoint. FIG. 2 illustrates Eaxc-ID in a low-level Rx endpoint. The qualifier "low-level" in the context of these endpoints is a terminology used by the ORAN specification in the context of standard YANG files.

Figure 3:
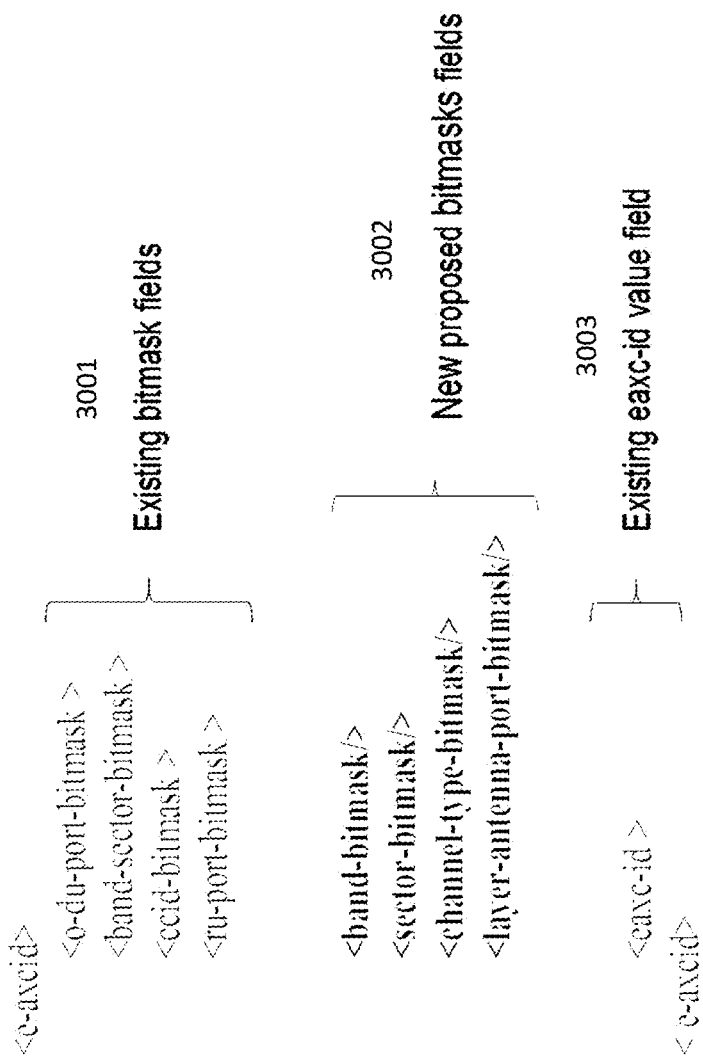
FIG. 3 illustrates augmentation of the field "e-axcid" under the low-level-Tx-endpoints and low-level-Rx-endpoints by adding new bitmasks.

According to an example embodiment shown in FIG. 3, the present disclosure augments the field "e-axcid" under the low-level-Tx-endpoints and low-level-Rx-endpoints by adding new bitmasks. In addition to the existing bitmask fields 3001 and existing e-axcid value field 3003, new proposed bitmask fields 3002 are provided.

In an example embodiment of the present disclosure, the four new bitmasks in the new bitmask fields 3002 are used along with the four existing bitmasks in the fields 3001 in the following manner. The <band-bitmask> and <sector-bitmask> are subset of the <band-sector-bitmask> and are used to define which bits within the band-sector subfield should be used to indicate band and which bits should be used to indicate sector-id. The <channel-type-bitmask> and <layer-antenna-port-bitmask> are subset of the <ru-port-bitmask> and are used to define which bits within the ru-port-id subfield should be used to indicate the channel type and which bits should be used to indicate antenna port/data layer number.

In an example embodiment of the present disclosure, the <band-bitmask> and <sector-bitmask> need not add up to use all the bits defined for <band-sector-bitmask>.

For example, the band-sector-id bitmask may have a value 16128, indicating six bits being used for band-sector-id (bits 3 to 8). Within these six bits (bits 3 to 8), only two bits may be used for indicating band (band-bitmask=12288, which means bits 3 and 4) and another two bits may be used for indicating sector (sector-bitmask=768, which means bits 7 and 8). The remaining two bits (bits 5 and 6) may be left unused.

In an example embodiment of the present disclosure, the <channel-type-bitmask> and <layer-antenna-port-bitmask> need not add up to use all the bits defined for <ru-port-bitmask>. For example, the ru-port-bitmask may have a value 15, indicating four bits being used for ru-port-id (bits 13 to 16). Within these four bits, only one bit may be used for indicating channel-type (channel-type-bitmask=8, which means bit 13) and another two bits may be used for indicating antenna-port/data-layer (layer-antenna-port-bitmask=3, which means bits 15 and 16). The remaining one bit (bits 14) may be left unused.

In an example embodiment of the present disclosure, any of the four new bitmasks in the new bitmask fields 3002 may be set to zero if the network function does not wish to identify the specific bits within the bit field. In addition, for supporting backward compatibility with network functions compliant with older versions of O-RAN specifications, the four new bitmask fields can be marked as "non-mandatory" in the YANG module.

In an example embodiment of the present disclosure, an enumerated data type is introduced for incorporation into the O-RAN specifications, which enumerated data type defines a specific set of values that can be used with the proposed new channel-type bitmask to indicate to the network functions how to interpret the values contained in those channel-type bitmask bits. In this example embodiment, the set of enumerated values may be defined as shown in FIG. 4, which set of enumerated values may be further extended. The definitions (of enumerations) shown in FIG. 4 (which include UL Channel Type Enumerations (O-RU to O-DU); DL Channel Type Enumerations (O-DU to O-RU); Layer Type Enumerations (O-DU to O-RU); and Antenna Port Type Enumerations (O-DU to O-RU)), may be used for TDD/FDD, LTE/NR and Cat-A/Cat-B (as defined in ORAN-WG4.CUS.0-v02.00—O-RAN Fronthaul Working Group— "Control, User and Synchronization Plane Specification") interfaces.

FIG. 5 illustrate an example set of values of the various bitmasks (existing bitmasks as well as newly incorporated bitmasks) and how these should be interpreted. The set of values shown in FIG. 5 is just one example, and it should be noted that the method and the system according to the present disclosure allow other bitmask values to be used as per the O-RU capabilities and required configuration. In the example shown in FIG. 5, the channel-type bitmask uses one bit and the layer-antenna-port bitmasks use two bits, i.e., in total these bitmasks use only three out of four bits used by ru-port-id subfield. However, for RUs supporting more antenna ports (e.g., in Massive MIMO cases), the layer-antenna-port bitmask can be extended to use three bits and thus support up-to 8 antenna ports/layers.

FIG. 6 illustrates example interpretations of various eaxc-id values, based on the enumerations definitions illustrated in FIG. 4 and the example bitmask values illustrated in FIG. 5.

In an example embodiment according to the present disclosure, the existing o-ran-uplane-confyang module may be enhanced to include the new bitmask fields (e.g., 3002 shown in FIG. 3) and the enumerations definition (e.g., illustrated in FIG. 4) as follows:

```
module o-ran-uplane-conf {
  ...
  ...
  typedef ChannelType {
    type enumeration {
      enum TYPE_PUCCH_PUSCH {
        value 0;
      }
      enum TYPE_PRACH {
        value 1;
      }
      enum TYPE_SRS {
        value 2;
      }
      enum TYPE_NON_SSB {
        value 0;
      }
      enum TYPE_SSB {
        value 1;
      }
    }
  }
  typedef LayerType {
    type enumeration {
      enum TYPE_LAYER_1{
        value 0;
      }
      enum TYPE_LAYER_2 {
        value 1;
      }
    }
  }
  typedef AntennaPortType {
    type enumeration {
      enum TYPE_ANTENNA_PORT_0{
        value 0;
      }
      enum TYPE_ANTENNA_PORT_1{
        value 1;
      }
    }
  }
  grouping eaxc {
    description
      "One eAxC identifier (eAxC ID) comprises a band and sector
      identifier (BandSector_ID), a component-carrier identifier
      (CC_ID) and a spatial stream identifier (RU_Port_ID).
      In this version of the specification, one eAxC contains only
      one spatial stream (i.e. one beam per subcarrier) at a time.
      Bit allocation is subdivided as follows:
      *  O_DU_Port_ID: Used to differentiate processing units
      at O-DU
      *  BandSector_ID: Aggregated cell identifier
      *  CC_ID: distinguishes Carrier Components
      *  RU_Port_ID: Used to differentiate spatial streams or
      beams on the O-RU
      The bitwidth of each of the above fields is variable this model
  is supposed to check
         if we are occupying bits continuously but we do not have to
  occupy all 16 bits";
    leaf o-du-port-bitmask {
      type uint16;
      mandatory true;
      description
        "mask for eaxc-id bits used to encode O-DU Port ID";
    }
    leaf band-sector-bitmask {
      type uint16;
      mandatory true;
      description
        "mask for eaxc-id bits used to encode the band sector ID";
    }
    leaf ccid-bitmask {
      type uint16;
      mandatory true;
      description
        "mask for eaxc-id bits used to encode the component carrier id";
    }
    leaf ru-port-bitmask {
      type uint16;
      mandatory true;
      description
        "mask for eaxc-id bits used to encode the O-RU Port ID";
```

```
    }
    leaf band-bitmask {
      type uint16;
      mandatory false;
      description
        "mask for eaxc-id bits used to encode band number";
    }
    leaf sector-bitmask {
      type uint16;
      mandatory false;
      description
        "mask for eaxc-id bits used to encode the sector";
    }
    leaf channel-type-bitmask {
      type uint16;
      mandatory false;
      description
        "mask for eaxc-id bits used to encode the channel type
         (e.g., PRACH, SSB)";
    }
    leaf layer-antenna-port-bitmask {
      type uint16;
      mandatory true;
      description
        "mask for eaxc-id bits used to encode the data layer or antenna
port/spatial stream number ";
    }
    leaf eaxc-id {
      type uint16;
      mandatory true;
      description
        "encoded value of eaxcid to be read by CU-Plane";
    }
  }
...
...
}
```

The above-listed values are merely exemplary, and other enumerated values may be defined for the bitmask.

Figure 7:
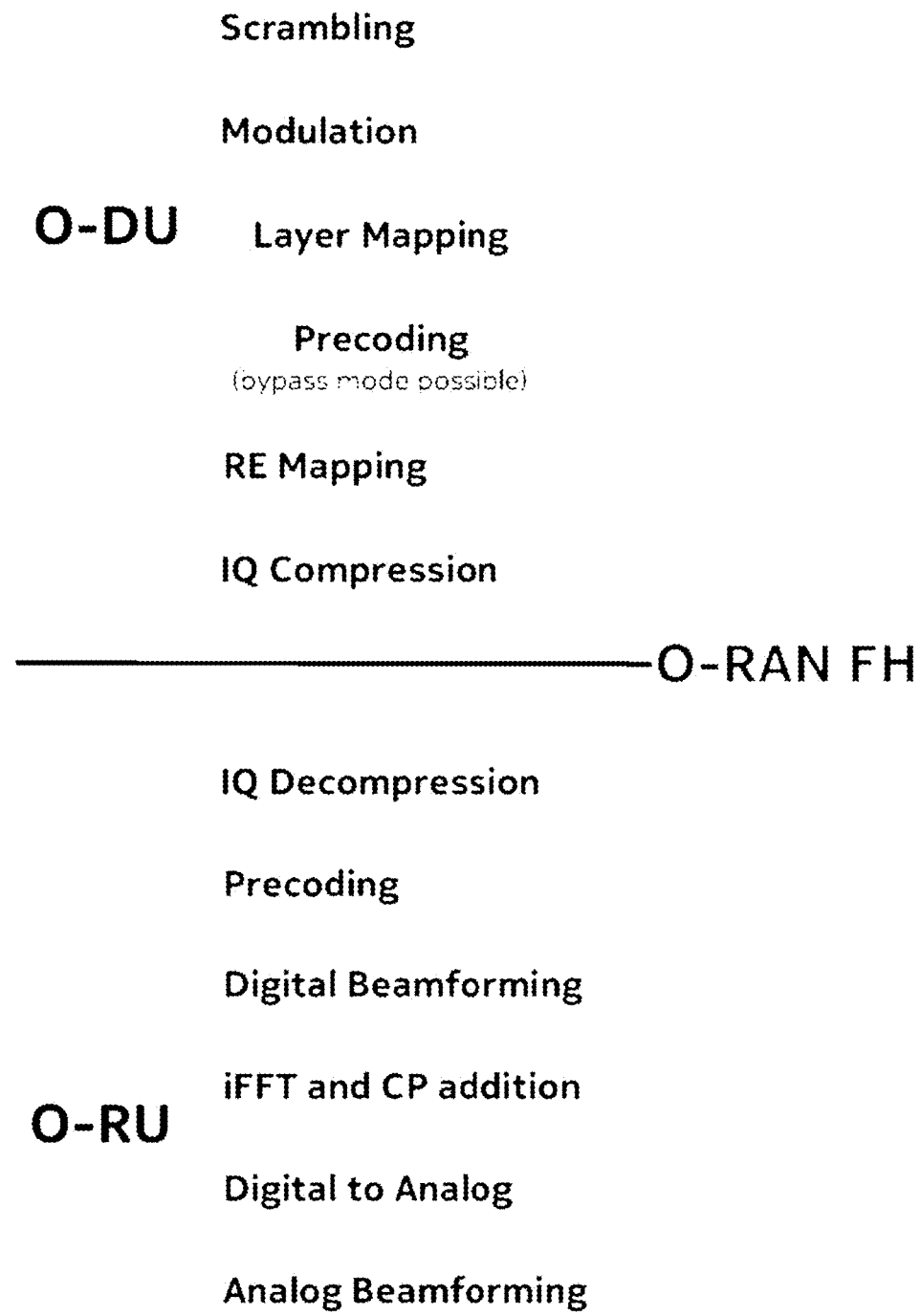
FIG. 7 illustrates an example O-RAN system architecture.

FIG. 7 illustrates an example O-RAN system architecture, in which the upper physical layer (U-PHY) blocks such as the scrambling, modulation, layer mapping, resource element (RE) mapping, and I/Q compression (as well as optional precoding, which may be bypassed in bypass mode) can be implemented in the O-DU 7001. The I/Q decompression, precoding, digital beamforming, inverse Fast Fourier Transform (iFFT), Cyclic Prefix (CP) addition, digital-to-analog conversion, and optionally analog beamforming can be implemented in the O-RU 7002. O-RAN fronthaul (FH) 7003 is shown between O-DU and O-RU. The example system architecture is illustrated in FIG. 7 merely for the purpose of providing a general system background for the example embodiments of the method according to the present disclosure, and the example system architecture of FIG. 7 should not be construed as limiting the present disclosure.

The present disclosure provides a first example method of enabling enhanced Management Plane (M-Plane) functions on the fronthaul interface between Open Radio Access Network Radio Unit (O-RU) and O-RAN Distributed Unit (O-DU) in an Open Radio Access Network (O-RAN)-compatible network, which method includes: identifying four subfields within 16-bit Extended Antenna Carrier Id (Eaxc-ID) field using a first set of four specified bitmasks, wherein the four subfields include DU_Port_ID bitmask, BandSector_ID bitmask, CC_ID bitmask, and RU_Port_ID bitmask; and providing at least one additional bitmask to identify additional information regarding at least one individual bit within at least one of the BandSector_ID bitmask subfield and RU_Port_ID bitmask subfield.

The present disclosure provides a second example method based on the above-discussed first example method, in which second example method the at least one additional bitmask identifies at least one individual bit conveying additional information regarding at least one of band, sector, channel type, antenna port and data layer.

The present disclosure provides a third example method based on the above-discussed second example method, in which third example method the at least one additional bitmask is part of a second set of specified bitmasks including at least one of a band-bitmask, a sector-bitmask, a channel-type-bitmask, and a layer-antenna-port-bitmask.

The present disclosure provides a fourth example method based on the above-discussed third example method, in which fourth example method at least one of: i) the band bitmask defines which bits within the BandSector_ID bitmask subfield are used to indicate band; ii) the sector bitmask defines which bits within the BandSector_ID bitmask subfield are used to indicate sector-id; iii) the channel-type bitmask defines which bits within the RU_Port_ID bitmask subfield are used to indicate channel type; and iv) the layer-antenna-port bitmask defines which bits within the RU_Port_ID bitmask subfield are used to indicate one of antenna port number or data layer number.

The present disclosure provides a fifth example method based on the above-discussed first example method, in which fifth example method the at least one additional bitmask is provided within the 16-bit Eaxc-ID field.

The present disclosure provides a sixth example method based on the above-discussed fifth example method, in which sixth example method the at least one additional bitmask overlaps the first set of four specified bitmasks.

The present disclosure provides a seventh example method based on the above-discussed third example method, which seventh example method further includes: providing an identification of at least one enumerated data type defining a specific set of values used in conjunction with the channel-type bitmask to indicate to O-RAN-compatible network functions how to interpret the values contained in the channel-type bitmask bits.

The present disclosure provides an eighth example method based on the above-discussed seventh example method, in which eight example method the at least one enumerated data type is defined by at least one of i) uplink (UL) Channel Type Enumerations, ii) downlink (DL) Channel Type Enumerations, iii) Layer Type Enumerations, and iv) Antenna Port Type Enumerations.

The present disclosure provides a ninth example method based on the above-discussed third example method, in which ninth example method the at least one additional bitmask is provided within the 16-bit Eaxc-ID field.

The present disclosure provides a tenth example method based on the above-discussed ninth example method, in which tenth example method the at least one additional bitmask overlaps the first set of four specified bitmasks.

The present disclosure provides an eleventh example method based on the above-discussed ninth example method, which eleventh example method further includes: providing an identification of at least one enumerated data type defining a specific set of values used in conjunction with the channel-type bitmask to indicate to O-RAN-compatible network functions how to interpret the values contained in the channel-type bitmask bits.

The present disclosure provides a twelfth example method based on the above-discussed eleventh example method, in which twelfth example method the at least one enumerated data type is defined by at least one of i) uplink (UL) Channel Type Enumerations, ii) downlink (DL) Channel Type Enumerations, iii) Layer Type Enumerations, and iv) Antenna Port Type Enumerations.

The present disclosure provides a thirteenth example method based on the above-discussed fourth example method, in which thirteenth example method the at least one additional bitmask overlaps the first set of four specified bitmasks.

The present disclosure provides a fourteenth example method based on the above-discussed thirteenth example method, which thirteenth example method further includes: providing an identification of at least one enumerated data type defining a specific set of values used in conjunction with the channel-type bitmask to indicate to O-RAN-compatible network functions how to interpret the values contained in the channel-type bitmask bits.

The present disclosure provides a fifteenth example method based on the above-discussed fourteenth example method, in which fourteenth example method the at least one enumerated data type is defined by at least one of i) uplink (UL) Channel Type Enumerations, ii) downlink (DL) Channel Type Enumerations, iii) Layer Type Enumerations, and iv) Antenna Port Type Enumerations.

Glossary of Terms

3GPP: Third generation partnership project
4G: 4$^{th}$ Generation
5G; 5$^{th}$ Generation
CC: Component Carrier
CNF: Cloud Native Network Function
C-plane: Control plane
CU: Central unit
DL: Downlink
DU: Distributed unit
Eaxc-id: Extended Antenna Carrier ID
FDD: Frequency Division Duplex
LTE: Long Term Evolution
M-plane: Management plane
MIMO: Multiple Input, Multiple Output
NMS: Network Management System
NR: New radio
OAM: Operation and Management
O-DU: ORAN-DU
O-RU: ORAN-RU
O-RAN: Open Radio Access Network
PNF: Physical Network Function
PRACH: Physical Random Access Channel
PUCCH: Physical Uplink Control Channel
PUSCH: Physical Uplink Shared Channel
RAN: Radio Access Network
RRU: Remote Radio Unit
RU: Radio Unit
Rx: Receive
SRS: Sounding Reference Signal
SSB: Synchronization Signal Block
TDD: Time Division Duplex
Tx: Transmit
U-plane: User plane
UL: Uplink

What is claimed is:

1. A method of enabling enhanced Management Plane (M-Plane) functions on the fronthaul interface between Open Radio Access Network Radio Unit (O-RU) and O-RAN Distributed Unit (O-DU) in an Open Radio Access Network (O-RAN)-compatible network, comprising:

identifying four subfields within 16-bit Extended Antenna Carrier Id (Eaxc-ID) field using a first set of four specified bitmasks, wherein the four subfields include DU_Port_ID bitmask, BandSector_ID bitmask, CC_ID bitmask, and RU_Port_ID bitmask; and providing at least one additional bitmask to identify additional information regarding at least one individual bit within at least one of the BandSector_ID bitmask subfield and RU_Port_ID bitmask subfield;

wherein the at least one additional bitmask identifies at least one individual bit conveying additional information regarding at least one of band, sector, channel type, antenna port and data layer, and wherein the at least one additional bitmask is part of a second set of specified bitmasks including at least one of a band-bitmask, a sector-bitmask, a channel-type-bitmask, and a layer-antenna-port-bitmask.

2. The method according to claim 1, wherein at least one of: i) the band bitmask defines which bits within the BandSector_ID bitmask subfield are used to indicate band; ii) the sector bitmask defines which bits within the BandSector_ID bitmask subfield are used to indicate sector-id; iii) the channel-type bitmask defines which bits within the RU_Port_ID bitmask subfield are used to indicate channel type; and iv) the layer-antenna-port bitmask defines which bits within the RU_Port_ID bitmask subfield are used to indicate one of antenna port number or data layer number.

3. The method according to claim 1, further comprising:
providing an identification of at least one enumerated data type defining a specific set of values used in conjunction with the channel-type bitmask to indicate to O-RAN-compatible network functions how to interpret the values contained in the channel-type bitmask bits.

4. The method according to claim 3, wherein the at least one enumerated data type is defined by at least one of i) uplink (UL) Channel Type Enumerations, ii) downlink (DL) Channel Type Enumerations, iii) Layer Type Enumerations, and iv) Antenna Port Type Enumerations.

5. The method according to claim 1, wherein the at least one additional bitmask is provided within the 16-bit Eaxc-ID field.

6. The method according to claim 5, wherein the at least one additional bitmask overlaps the first set of four specified bitmasks.

7. The method according to claim 5, further comprising:
providing an identification of at least one enumerated data type defining a specific set of values used in conjunction with the channel-type bitmask to indicate to O-RAN-compatible network functions how to interpret the values contained in the channel-type bitmask bits.

8. The method according to claim 7, wherein the at least one enumerated data type is defined by at least one of i) uplink (UL) Channel Type Enumerations, ii) downlink (DL) Channel Type Enumerations, iii) Layer Type Enumerations, and iv) Antenna Port Type Enumerations.

9. The method according to claim 2, wherein the at least one additional bitmask overlaps the first set of four specified bitmasks.

10. The method according to claim 9, further comprising:
providing an identification of at least one enumerated data type defining a specific set of values used in conjunction with the channel-type bitmask to indicate to O-RAN-compatible network functions how to interpret the values contained in the channel-type bitmask bits.

11. The method according to claim 10, wherein the at least one enumerated data type is defined by at least one of i) uplink (UL) Channel Type Enumerations, ii) downlink (DL)

Channel Type Enumerations, iii) Layer Type Enumerations, and iv) Antenna Port Type Enumerations.

* * * * *